UNITED STATES PATENT OFFICE.

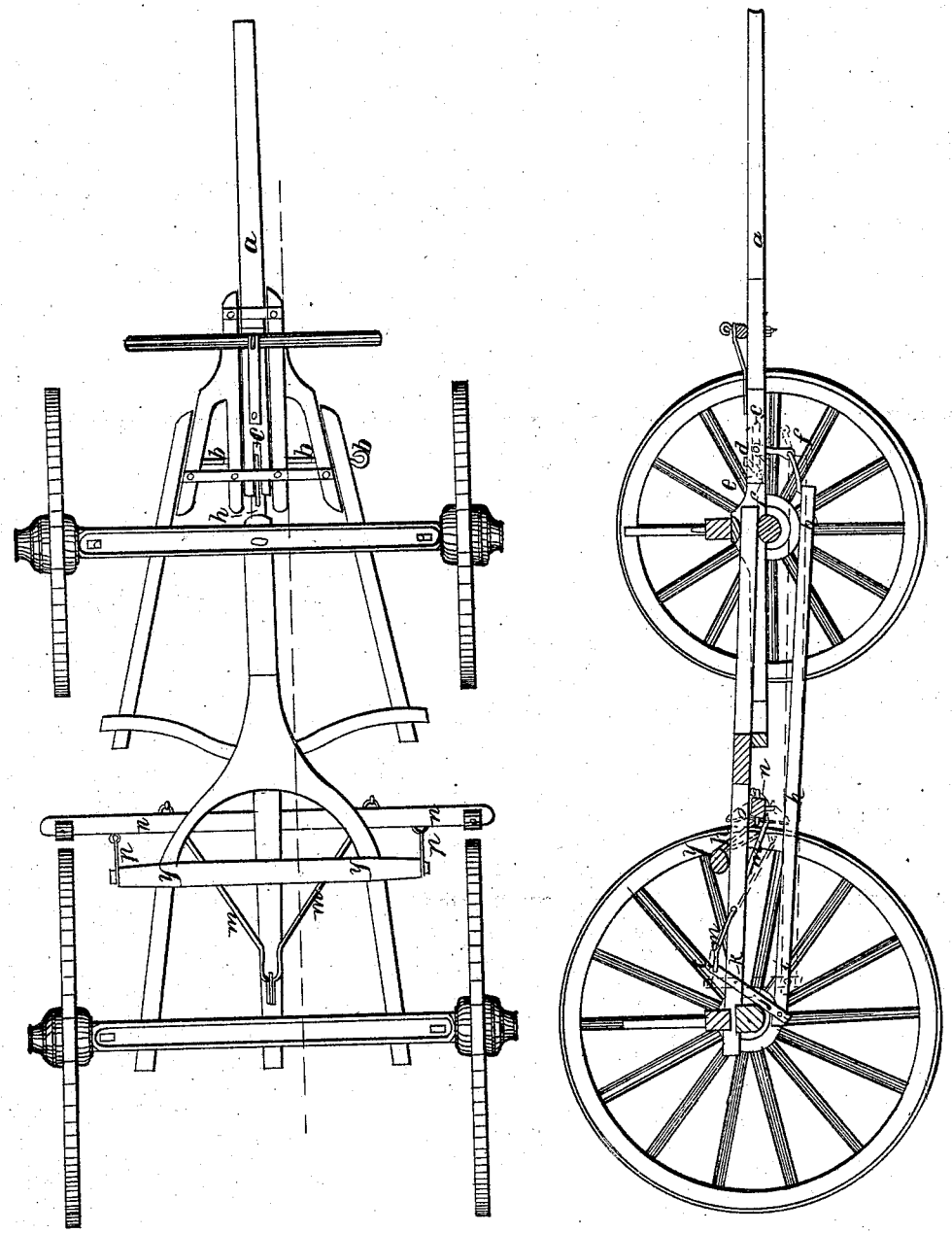

P. G. VAN HOUTEN, OF COHOCTON, NEW YORK.

IMPROVEMENT IN ACTING WAGON-BRAKES.

Specification forming part of Letters Patent No. 43,244, dated June 21, 1864.

*To all whom it may concern:*

Be it known that I, P. G. VAN HOUTEN, of Cohocton, in the county of Steuben and State of New York, have invented a new and useful method of constructing Self-Acting Brakes for Wagons; and I do hereby declare that the following is a full and exact description of the same, reference being had to the accompanying drawings, and to the letters of reference marked thereon.

The object of my invention is to construct a brake for wagons that will be worked by the holding back of the team when going down a hill, but which will not hold the wheels in backing the wagon.

To accomplish this object, I make a brake in the manner illustrated in the accompanying drawings.

The tongue $a$ works back and forth on the rod $b$ in the mortised groove $c$. The end of the tongue is fastened by the bolt $d$ to the rod $e$, which connects with the upper arm of the angular lever $f$. The lower arm of the lever is connected by the rod $g$ to the wooden pole $h$, which runs under the reach of the wagon. The other end of this pole is attached by the bolt $i$ to the upright lever $j$, which works on the rod $k$. The upper end of the lever is attached at $l$ to the two rods $m$ $m$, which are attached under the reach to the brake bar $n$, on the ends of which are the brakes $o$ $o$. The brake-bar $n$ is hung by the rods $p$ $p$ to the wooden cross-bar $y$, fastened across and above the reach, and works back and forth. The whole is so arranged that the holding back of the team in going down a hill, by pushing back the tongue, acts upon the angular lever $f$ so as to bring forward the pole $h$, which, by the lever $j$ and the rods $m$ $m$, pulls the brakes back upon the wheel. The position of the brakes and the apparatus which works them is then indicated by the red lines in Figure 2. When the tongue is drawn forward, the action is reversed and the wheels freed of the brakes. The position of the brakes when the tongue is drawn forward is shown by the black lines in Fig. 2.

In backing the wagon the wheels are not locked, for the brake-bar, being hung by the rods $p$ $p$ to the cross-bar $y$, as described, is lifted up by the rubbing of the wheels against the brakes, so that the friction is very slight, and is no impediment to the movements of the wagon.

What I claim as new in my invention, and desire to secure by Letters Patent, is—

The angular lever $f$, in combination with the tongue $a$, the pole $h$, the attachment of the brake-bar $n$, under the reach of the wagon, by the rods $p$ $p$, to the cross-bar $y$, in the manner and for the purpose described.

P. G. VAN HOUTEN.

Witnesses:
J. H. BUTLER,
WM. WASHBURN.